(No Model.)
J. KRIEGER & A. DALLMER.
BRAKE HOLDER FOR VELOCIPEDES.
No. 445,118. Patented Jan. 20, 1891.
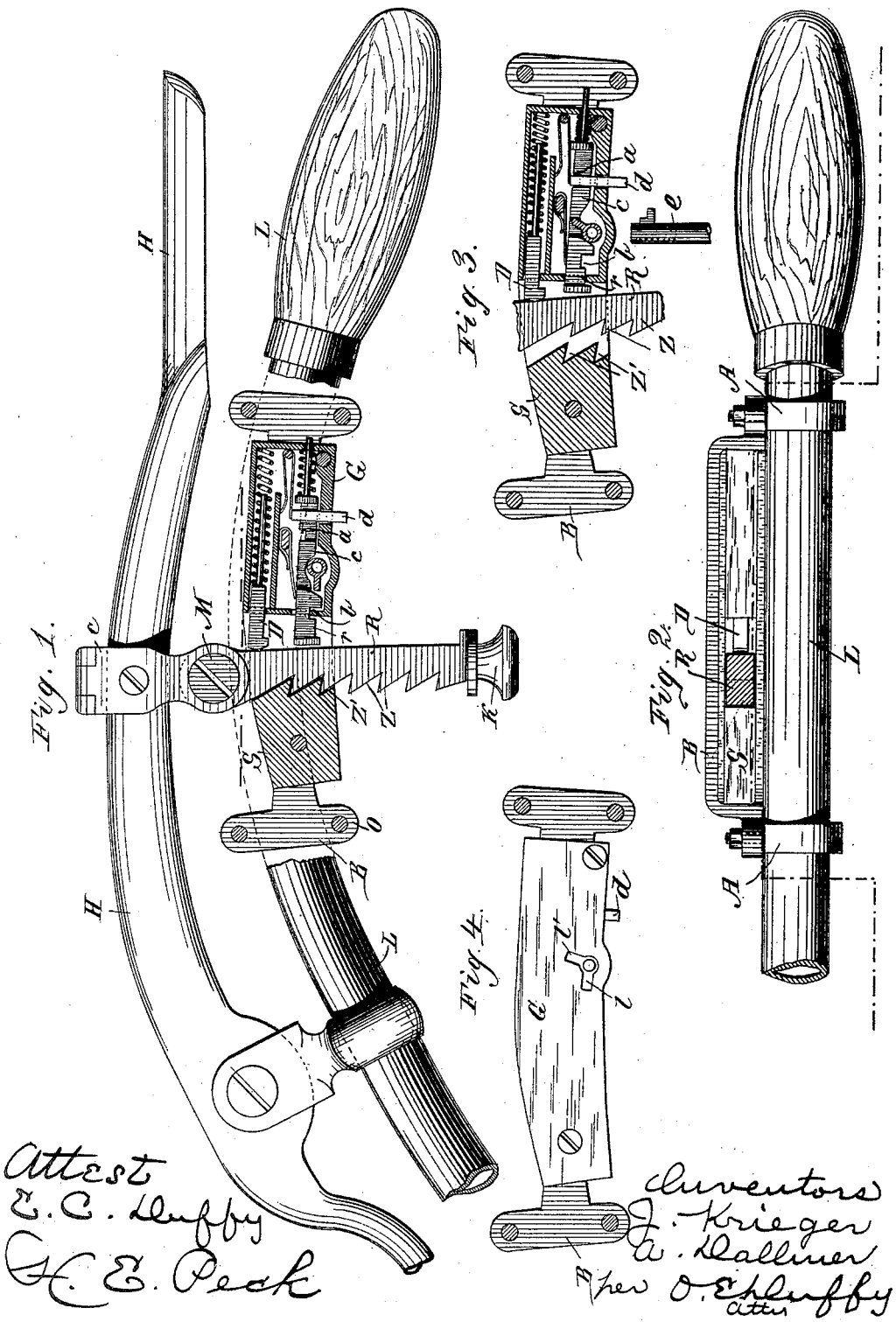

UNITED STATES PATENT OFFICE.

JULIUS KRIEGER AND ALBERT DALLMER, OF DRESDEN, GERMANY.

BRAKE-HOLDER FOR VELOCIPEDES.

SPECIFICATION forming part of Letters Patent No. 445,118, dated January 20, 1891.

Application filed January 17, 1890. Serial No. 337,272. (No model.) Patented in England December 24, 1889, No. 20,761.

*To all whom it may concern:*

Be it known that we, JULIUS KRIEGER and ALBERT DALLMER, subjects of the Emperor of Germany, residing in Dresden, Germany, have invented certain new and useful Improvements in Brake-Holders, (for which we have applied for Letters Patent of Great Britain, No. 20,761, dated December 24, 1889,) of which the following is a specification.

The object of this invention is to lock the brakes of vehicles in any of the positions to which the said brakes may be moved, so that, if desired, the wheels may be locked so as to prevent them being rotated until again released.

It is well known that in order to apply the brake it is necessary to grasp and pull the lever connected with the brake. The moment this lever is released the brake ceases entirely from acting upon the wheel; but when it is desired to control the effect of the brake—*i. e.*, to pull the hand-lever with more or less force by the hand mainly resting upon the steering handle or yoke—a great experience is necessary, especially when the wheels, in addition to having the brake applied to them, are to have at the same time their direction changed, and what is more difficult still is to apply the brake to the wheels uniformly for any length of time, and more especially to apply it so with comparatively little power, as is necessary, for example, on gently-sloping roads.

By means of the device herein described the brake may be set exactly to the desired degree and its effect easily increased, decreased, or entirely suppressed, according to the exigencies of the moment; and a further object of this device is so to lock the wheel in position that it should be impossible for any uninitiated person to set it in motion when it is intended to remain at rest.

The essential features of the apparatus are illustrated in the accompanying drawings as applied to a velocipede.

In the drawings, Figure 1 is a plan view of the apparatus as applied to the brake-lever and the steering-handle, with the case of the lock removed. Fig. 2 is a side view of the same. Fig. 3 is a plan of the open lock with the key shown in section, and Fig. 4 is a plan of the lock with the key-hole exposed to view.

A hinge C, destined to be connected with rack R, is passed over brake-lever H, Fig. 1, which may be oval in section. The two shanks or arms of the hinge C pass round the lever H, and the rack R is interposed between their ends, the whole being secured together by a screw M. The screw P is only to be used as a tightening-screw. The adjustable rack R, held between the shanks or arms of hinge C and on whose forward end a knob $k$ is screwed, is adapted to pivot on screw M. It is provided with ratchet-teeth Z and so passed through lock S that these teeth may engage with similar teeth Z', formed in the casing of the lock, but may also be readily disengaged therefrom, owing to the elongated shape of the aperture of the lock.

A bolt D, suitably guided within the lock-case, constantly bears under spring-pressure upon the back edge of rack R. This pressure-bolt D will slide backward whenever the rack is shifted sidewise, which enables the latter to be disengaged from the teeth Z' of the lock, to be withdrawn from such lock, and to be re-engaged with either of the teeth of the same, as required, Fig. 3. When the last tooth is engaged, the power of the brake attains its highest degree, and this power gradually decreases at each of the succeeding teeth, while when the foremost one is reached the brake is entirely free. A sliding pressure-bolt $r$ is also located within the lock-case, with a spring tending to move it forward, though its spontaneous forward motion is prevented by a catch device, so that a key is necessary to shift it backward and forward. Under ordinary circumstances and when the wheel is in motion, pressure-bolt $r$ is held back, as in Fig. 3, a small spring-catch or detent $d$, engaging in slot or recess $a$ of bolt $r$, retaining it in this backward position. By pressing catch $d$ inward pressure-bolt $r$ is disengaged, and thereby allowed to spring forward and to take position against the back edge of rack R, when the recess $b$ engages with the casing, and in which position it is maintained by means of a spring, as shown in Fig. 1. In this position rack R is locked, so that it can move neither in nor out, and if the brake be at the same time applied to the wheel with sufficient force such wheel is also locked in position and prevented from turning.

To release the brake and unlock rack R, a key is used, which, together with its bit $e$, is inserted into the key-hole $l$, Fig. 4. When such key is turned to the right, its bit raises bolt $r$, so as to move the recess $b$ free of the lock-casing. The side of the bit $e$ then meets the enlarged portion $c$ of bolt $r$, as in Fig. 3, and so shifts the latter as to enable the catch $d$ to re-enter the recess $a$, which locks bolt $r$ in its inward position and sets free rack R, which can be shifted backward and forward, as desired. The key is removable from key-hole $l'$, and can be taken away by the person intrusted with its use.

A bent piece or yoke B is rigidly attached to the lock-case S. Its ends are extended so as to form ears O on either side, which are screwed to the shackles or clips A A, passed around the steering-handle.

The device herein described is applicable to any trailing or other wheel without necessitating any alteration of the same, and wherever applied is sure to prove indispensable.

We claim—

The combination, with the brake-bar and the handle-bar, of a laterally-swinging rack-bar pivoted to the brake-bar and provided with a series of ratchet-teeth in one edge, a lock secured to the handle-bar by a band or yoke and consisting of an apertured case through which said rack-bar extends, said case being provided with teeth to mesh with said rack-teeth, and with a spring-pressure bolt constantly bearing against the edge of said rack-bar and with another bolt whereby the said rack-bar can be locked, substantially as described.

In testimony whereof we have hereto set our hands in the presence of the two subscribing witnesses.

JULIUS KRIEGER.
ALBERT DALLMER.

Witnesses:
OTTO WOLFF,
BRUNO KÄSSNER.